United States Patent
Wang et al.

(10) Patent No.: US 12,382,405 B2
(45) Date of Patent: Aug. 5, 2025

(54) COMMUNICATION METHOD AND APPARATUS

(71) Applicant: HUAWEI TECHNOLOGIES CO., LTD., Shenzhen (CN)

(72) Inventors: Yu Wang, Hangzhou (CN); Jianwei Zhou, Hangzhou (CN); Hejia Luo, Hangzhou (CN); Yunfei Qiao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 17/882,060

(22) Filed: Aug. 5, 2022

(65) Prior Publication Data

US 2022/0377687 A1 Nov. 24, 2022

Related U.S. Application Data

(63) Continuation of application No. PCT/CN2021/073133, filed on Jan. 21, 2021.

(30) Foreign Application Priority Data

Feb. 10, 2020 (CN) .......................... 202010085210.0

(51) Int. Cl.
*H04W 56/00* (2009.01)
*H04W 84/06* (2009.01)

(52) U.S. Cl.
CPC ....... *H04W 56/001* (2013.01); *H04W 56/003* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 2019/0141587 A1 | 5/2019 | Astrom et al. | |
| 2019/0215790 A1 | 7/2019 | Kim et al. | |
| 2019/0222368 A1* | 7/2019 | Yang | H04L 5/0048 |
| 2020/0337005 A1* | 10/2020 | Bengtsson | H04W 56/0015 |
| 2020/0404537 A1* | 12/2020 | Harada | H04J 11/0073 |

(Continued)

FOREIGN PATENT DOCUMENTS

| | | |
|---|---|---|
| CN | 108282859 A | 7/2018 |
| CN | 108702796 A | 10/2018 |

(Continued)

OTHER PUBLICATIONS

"RAN4-NR#3 Meeting report", 3GPP TSG-RAN WG4 Meeting #84bis, XP051358955, Oct. 9-13, 2017, 128 pages.

*Primary Examiner* — Scott M Sciacca
(74) *Attorney, Agent, or Firm* — Maier & Maier, PLLC

(57) ABSTRACT

A terminal determines a first frequency for accessing the network device Then, the terminal determines at least one second frequency based on the first frequency, where any second frequency is different from the first frequency, and at least two second frequencies are also different. The terminal selects at least two different second frequencies from the first frequency and the at least one second frequency. The terminal separately receives, in a time unit in a period by using the at least two different frequencies, an SSB from the network device. The terminal accesses the network device based on received one or more different SSBs.

18 Claims, 10 Drawing Sheets

(56) References Cited

U.S. PATENT DOCUMENTS

2021/0007076 A1* 1/2021 Ljung .................. H04W 76/28
2021/0211957 A1* 7/2021 Kamohara ........... H04B 7/0617

FOREIGN PATENT DOCUMENTS

| CN | 109936430 A | 6/2019 |
|----|----|----|
| CN | 110022591 A | 7/2019 |
| CN | 110351852 A | 10/2019 |
| CN | 110475309 A | 11/2019 |
| CN | 110740017 A | 1/2020 |
| CN | 110741590 A | 1/2020 |
| KR | 1020200007686 A | 1/2020 |
| WO | 2018126847 A1 | 7/2018 |
| WO | 2018171379 A1 | 9/2018 |
| WO | 2018227856 A1 | 12/2018 |
| WO | 2018231003 A1 | 12/2018 |
| WO | 2019057018 A1 | 3/2019 |
| WO | 2019136646 A1 | 7/2019 |
| WO | 2019154214 A1 | 8/2019 |

* cited by examiner

COMMUNICATION METHOD AND APPARATUS

CROSS-REFERENCE TO RELATED APPLICATIONS

This application is a continuation of International Application No. PCT/CN2021/073133, filed on Jan. 21, 2021, which claims priority to Chinese Patent Application No. 202010085210.0, filed on Feb. 10, 2020. The disclosures of the aforementioned applications are hereby incorporated by reference in their entireties.

FIELD

The embodiments relate to the field of wireless communication technologies, a communication method, and an apparatus.

BACKGROUND

After being powered on, a terminal device may receive a synchronization signal block (SSB) sent by a network device and access the network device based on the SSB. A process may be as follows:

Frequencies of a plurality of cells are configured for the network device. For example, as shown in FIG. 1, a frequency for accessing a cell is fc. It should be noted that the frequency fc herein actually refers to a frequency band SSB bandwidth using fc as a center frequency, and the frequency band herein is briefly referred to as the frequency fc. SSB bandwidth is a part of a cell bandwidth. The network device separately sends different SSBs by using the frequency fc in different time units. For example, an SSB 0 is sent in a time unit T1, an SSB 1 is sent in a time unit T2, and an SSB 2 is sent in a time unit T3.

For the terminal device, frequencies for accessing a plurality of cells are configured for the terminal device, and the terminal device blindly detects an SSB by using a plurality of different frequencies. When receiving the SSB, the terminal device may access a corresponding cell based on information in the received SSB.

It should be noted that, if the network device configures n different SSBs, for example, SSB0 to SSBn−1, the SSBs may be divided into n time units (for example, T1 to Tn) for respective sending. The network device may cyclically send all of the n SSBs.

Generally, the terminal device traverses a period, and accesses the network device based on information about one or more SSBs received in the period.

When a large quantity of SSBs is configured in a network, in a manner of sending an SSB through intra-frequency and time-division scanning shown in FIG. 1, it takes a long time for the terminal device to traverse a period. As a result, a time for the terminal device to access the network is also increased.

SUMMARY

The embodiments may provide a communication method and apparatus, to resolve a current problem that it takes a long time for a terminal device to access a network.

According to a first aspect, a communication method is provided, and a terminal device may determine a first frequency for accessing a network device. The terminal device determines at least one second frequency based on the first frequency, where any second frequency is different from the first frequency. If there are at least two second frequencies, the at least two second frequencies are different. Further, the terminal device may select at least two different second frequencies from the first frequency and the at least one second frequency. The terminal device may separately receive, in a time unit in a period by using the at least two different frequencies, a synchronization signal block SSB from the network device. In other words, the at least two different frequencies used to receive the SSB belong to a frequency set including the first frequency and the at least one second frequency. Finally, the terminal device accesses the network device based on received one or more different SSBs. The period includes at least two time units. SSBs separately received in different time units in the period are different. SSBs received in the time unit by using different frequencies are different. Different SSBs received in the time unit correspond to different beams.

The terminal device first determines the first frequency for accessing the network device, and then determines the at least one second frequency based on the first frequency. The terminal device selects the at least two different frequencies from the first frequency and the second frequency to separately receive the SSB. In other words, the terminal device may receive at least two SSBs in the time unit. Correspondingly, the network device sends the at least two SSBs in the time unit. If a plurality of SSBs is configured on a network device side, compared with sending the SSB in the time unit, a configured SSB can be sent as soon as possible. In this case, the terminal device may also receive, in a shorter time, the SSB configured by the network device. Therefore, the terminal device can reduce a time for accessing the network device. The network device may be a terrestrial network device, or may be a non-terrestrial network device, for example, a satellite.

In a possible implementation, the terminal device may further determine whether beams corresponding to different SSBs that are received by using a same frequency in adjacent time units are the same. In other words, the terminal device determines whether two SSBs that use the same frequency and are received by the terminal device are the same.

Satellite network services are uneven. When there is a large quantity of terminal users in an area, a camping time of a beam covering the area is long. When there is a small quantity of terminal users in an area, a camping time of a beam covering the area is short. When the network device sends the SSB, if a camping time of a beam currently used for sending the SSB is long, the camping time may be postponed to a next time unit for sending the SSB. In this case, different SSBs sent by the network device in adjacent time units correspond to a same beam. If a camping time of the beam currently used for sending the SSB is short, the camping time is not postponed to the next time unit for sending the SSB, and different SSBs sent by the network device in adjacent time units correspond to different beams. Based on inter-frequency SSB sending, the terminal device may further determine whether the beams corresponding to the different SSBs that are received by using the same frequency in the adjacent time units are the same. Under the same circumstances, SSBs of a same beam can be soft combined to improve demodulation performance, and resources can be combined to improve resource utilization.

In a possible implementation, when the terminal device determines whether the beams corresponding to the different SSBs received within the adjacent time units by using the same frequency are the same, the SSBs received by the terminal device may include a first indication. The first indication indicates whether a beam corresponding to an SSB sent by the network device by using a third frequency in a first time unit is the same as a beam corresponding to an SSB sent by using the third frequency in a second time unit. The second time unit is adjacent to the first time unit, and the third frequency is any one of the at least two different frequencies. The terminal device may determine, based on the first indication, whether the beam corresponding to the SSB received by using the third frequency in the first time unit is the same as the beam corresponding to the SSB received by using the third frequency in the second time unit. The first time unit may be earlier than the second time unit or may be later than the second time unit.

The first indication is added to the SSB, to indicate whether two SSBs in adjacent time units with a same frequency and in a same space domain correspond to a same beam. The terminal device may determine, based on the first indication in the SSB, whether the beams corresponding to the different SSBs that are received by using the same frequency in the adjacent time units are the same. The first indication may occupy one bit or may occupy more bits.

In a possible implementation, the terminal device may determine the second frequency based on the first frequency, where the first frequency supports polarization reuse. This manner is applicable to a polarization reuse scenario.

Alternatively, the terminal device determines at least one or at most three second frequencies based on the first frequency, where the first frequency does not support polarization reuse. This manner is applicable to a non-polarization reuse scenario.

A quantity of frequencies used to receive the SSB is related to N in N-color reuse of the terminal device, where N is a frequency reuse factor. Generally, the terminal device receives the SSB by using the first frequency and all of the second frequencies. In this case, a quantity of the second frequencies is related to N.

In a possible implementation, the terminal device may separately receive, in the time unit by using the at least two different frequencies, the SSB from the network device. In other words, one frequency receives one SSB.

Alternatively, the terminal device may separately receive, in the time unit by using the at least two different frequencies, the two different SSBs from the network device. In other words, one frequency receives two SSBs. Beams that correspond to the two different SSBs and that are received by using a frequency in the time unit are distinguished by using a space domain.

In a possible implementation, different SSBs include different numbers.

In a possible implementation, the SSB includes a second indication, and the second indication indicates space domain information and time unit information of the SSB sent by the network device.

Further, the second indication further indicates frequency information of the SSB sent by the network device.

In a possible implementation, adjacent frequencies in the at least two different frequencies have a same frequency spacing.

According to a second aspect, a communication method is provided. A network device may separately send a synchronization signal block SSB in a time unit in a period by using at least two different frequencies. The period includes at least two time units. SSBs separately sent in different time units in the period are different. SSBs sent in the time unit by using different frequencies are different. Different SSBs sent in the time unit correspond to different beams.

The network device sends the at least two SSBs in the time unit. If a plurality of SSBs is configured on a network device side, compared with sending the SSB in the time unit, a configured SSB can be sent as soon as possible. In this case, the terminal device may also receive, in a shorter time, the SSB configured by the network device. Therefore, the terminal device can reduce a time for accessing the network device. The network device may be a terrestrial network device, or may be a non-terrestrial network device, for example, a satellite.

In a possible implementation, the network device may determine at least one second frequency based on a first frequency, where any second frequency is different from the first frequency. When there are at least two second frequencies, the at least two second frequencies are different. The at least two different frequencies used to send the SSB belong to a frequency set including the first frequency and the at least one second frequency.

The network device may select at least two different second frequencies from the first frequency and the at least one second frequency as frequencies for sending the SSB. Generally, the first frequency and all second frequencies are used as frequencies for sending the SSB.

In a possible implementation, different SSBs sent by using a same frequency in adjacent time units correspond to a same beam or different beams.

Satellite network services are uneven. When there is a large quantity of terminal users in an area, a camping time of a beam covering the area is long. When there is a small quantity of terminal users in an area, a camping time of a beam covering the area is short. When the network device sends the SSB, if a camping time of a beam currently used for sending the SSB is long, the camping time may be postponed to a next time unit for sending the SSB. In this case, different SSBs sent by the network device in adjacent time units correspond to a same beam. If a camping time of the beam currently used for sending the SSB is short, the camping time is not postponed to the next time unit for sending the SSB, and different SSBs sent by the network device in adjacent time units correspond to different beams. When the different SSBs correspond to the same beam, the terminal device may perform soft combination on the SSBs of the same beam, to improve demodulation performance, and combine resources, to improve resource utilization.

In a possible implementation, the SSB includes a first indication. The first indication indicates whether a beam corresponding to an SSB sent by the network device by using a third frequency in a first time unit is the same as a beam corresponding to an SSB sent by using the third frequency in a second time unit. The second time unit is adjacent to the first time unit. The third frequency is any one of the at least two different frequencies. The first time unit is earlier than the second time unit, or the first time unit is later than the second time unit.

The first indication is added to the SSB, to indicate whether two SSBs in adjacent time units with a same frequency and in a same space domain correspond to a same beam. The terminal device may determine, based on the first indication in the SSB, whether the beams corresponding to the different SSBs that are received by using the same frequency in the adjacent time units are the same. The first indication may occupy one bit or may occupy more bits.

In a possible implementation, the network device may determine the second frequency based on the first frequency, where the first frequency supports polarization reuse. This manner is applicable to a polarization reuse scenario.

Alternatively, the network device determines at least one or at most three second frequencies based on the first frequency, where the first frequency does not support polarization reuse. This manner is applicable to a non-polarization reuse scenario.

A quantity of frequencies used to send the SSB is related to N in N-color reuse of the network device, where N is a frequency reuse factor. Generally, the network device sends the SSB by using the first frequency and all of the second frequencies. In this case, a quantity of the second frequencies is related to N.

In a possible implementation, the network device may separately send, in the time unit by using the at least two different frequencies, the SSB. In other words, one SSB is sent by using one frequency.

Alternatively, the network device may separately send, in the time unit by using the at least two different frequencies, the two different SSBs. In other words, two SSBs are sent by using one frequency. Beams that correspond to the two different SSBs and that are sent by using a frequency in the time unit are distinguished by using a space domain.

In a possible implementation, different SSBs include different numbers.

In a possible implementation, the SSB includes a second indication, and the second indication indicates space domain information and time unit information of the SSB sent by the network device.

Further, the second indication further indicates frequency information of the SSB sent by the network device.

In a possible implementation, adjacent frequencies in the at least two different frequencies have a same frequency spacing.

For a third aspect and any possible implementation of the third aspect to a thirteenth aspect and any possible implementation of the thirteenth aspect, refer to the first aspect, the second aspect, and the corresponding possible implementations. Details are not described again.

According to a third aspect, a communication apparatus is provided, and the communication apparatus has a function of implementing the terminal device in the foregoing method embodiments. The function may be implemented by hardware or may be implemented by hardware by executing corresponding software. The hardware or software includes one or more function modules corresponding to the foregoing functions.

According to a fourth aspect, a communication apparatus is provided, and the communication apparatus has a function of implementing the network device in the foregoing method embodiments. The function may be implemented by hardware or may be implemented by hardware by executing corresponding software. The hardware or software includes one or more function modules corresponding to the foregoing functions.

According to a fifth aspect, a communication apparatus is provided. The communication apparatus may be the terminal device in the foregoing method embodiments or a chip disposed in the terminal device. The communication apparatus includes a transceiver and a processor. Optionally, the communication apparatus further includes a memory. The memory is configured to store a computer program or instructions. The processor is separately coupled to the memory and the transceiver. When the processor executes the computer program or the instructions, the communication apparatus performs the method performed by the terminal device in the foregoing method embodiments.

According to a sixth aspect, a communication apparatus is provided. The communication apparatus may be the network device in the foregoing method embodiments, or a chip disposed in the network device. The communication apparatus includes a transceiver and a processor. Optionally, the communication apparatus further includes a memory. The memory is configured to store a computer program or instructions. The processor is separately coupled to the memory and the transceiver. When the processor executes the computer program or the instructions, the communication apparatus performs the method performed by the network device in the foregoing method embodiments.

According to a seventh aspect, a computer program product is provided, where the computer program product includes computer program code. When the computer program code is run on a computer, the computer is enabled to perform the method performed by the terminal device in any one of the first aspect or the possible implementations of the first aspect.

According to an eighth aspect, a computer program product is provided, where the computer program product includes computer program code. When the computer program code is run on a computer, the computer is enabled to perform the method performed by the network device in any one of the second aspect or the possible implementations of the second aspect.

According to a ninth aspect, a chip system is provided, configured to implement functions of the terminal device in the method according to any one of the first aspect or the possible implementations of the first aspect.

The chip system may include a transceiver, and the transceiver receives or sends, for example, data and/or information in the foregoing method.

The chip system may further include a memory, and the memory is configured to store program instruction and/or data. The chip system may include a chip or may include a chip and another discrete component.

The chip system may further include a communication interface. The communication interface may be configured to exchange data with another component, and the communication interface is, for example, a pin on a chip.

According to a tenth aspect, a chip system is provided, configured to implement functions of the network device in the method according to any one of the second aspect or the possible implementations of the second aspect.

The chip system may include a transceiver, and the transceiver receives or sends, for example, data and/or information in the foregoing method.

The chip system may further include a memory, and the memory is configured to store program instruction and/or data. The chip system may include a chip or may include a chip and another discrete component.

The chip system may further include a communication interface. The communication interface may be configured to exchange data with another component, and the communication interface is, for example, a pin on a chip.

According to an eleventh aspect, a computer-readable storage medium is provided. The computer-readable storage medium stores a computer program. When the computer program is run, the method performed by the terminal device in any one of the first aspect or the possible implementations of the first aspect is implemented.

According to a twelfth aspect, a computer-readable storage medium is provided. The computer-readable storage medium stores a computer program. When the computer program is run, the method performed by the network device in any one of the second aspect or the possible implementations of the second aspect is implemented.

According to a thirteenth aspect, a communication system is provided. The system may include a terminal device that performs the method according to any one of the first aspect or the possible implementations of the first aspect, and a network device that performs the method according to any one of the second aspect or the possible implementations of the second aspect.

DESCRIPTION OF EMBODIMENTS

The following describes in detail the embodiments with reference to accompanying drawings.

The embodiments may be applied to various communication systems, for example, a terrestrial communication system and a non-terrestrial communication system, for example, a satellite communication system. The satellite communication system may be integrated with a conventional mobile communication system. For example, the mobile communication system may be a 4th generation (4G) communication system (for example, a long term evolution (LTE) system), a worldwide interoperability for microwave access (WiMAX) communication system, a 5th generation (5G) communication system (for example, a new radio (NR) system), or a mobile communication system in the future.

Figure 2:
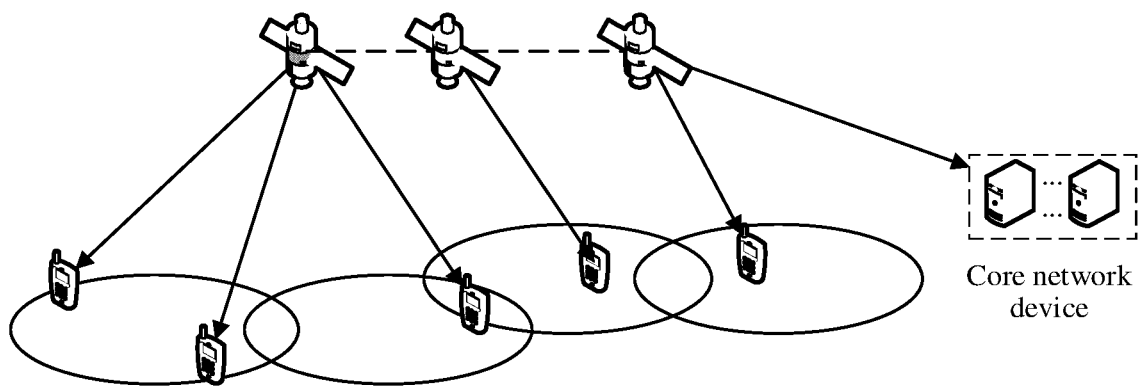
FIG. 2 is a schematic diagram of a satellite communication system according to an embodiment.

For example, FIG. 2 is a schematic diagram of a possible architecture of a satellite communication system. If the satellite communication system is compared with a ground communication system, a satellite may be considered as one or more network devices such as a base station on the ground. An access point 1, an access point 2, and even an access point 3 to an access point n (not shown in the figure) correspond to different satellites or terrestrial network devices. A satellite provides a communication service for a terminal device, and the satellite may be further connected to a core network device (for example, an AMF). The satellite may be a non-geostationary earth orbit (NGEO) satellite or a geostationary earth orbit (GEO) satellite.

The embodiments are also applicable to a terrestrial communication system, and the satellite in FIG. 2 may be replaced with a terrestrial network device.

For ease of understanding of the embodiments, a scenario is described below. A service scenario is intended to describe the embodiments more clearly and does not constitute a limitation on the embodiments. It may be learned by a person of ordinary skill in the art that, with emergence of a new service scenario, the embodiments are also applicable to a similar problem.

Figure 3:
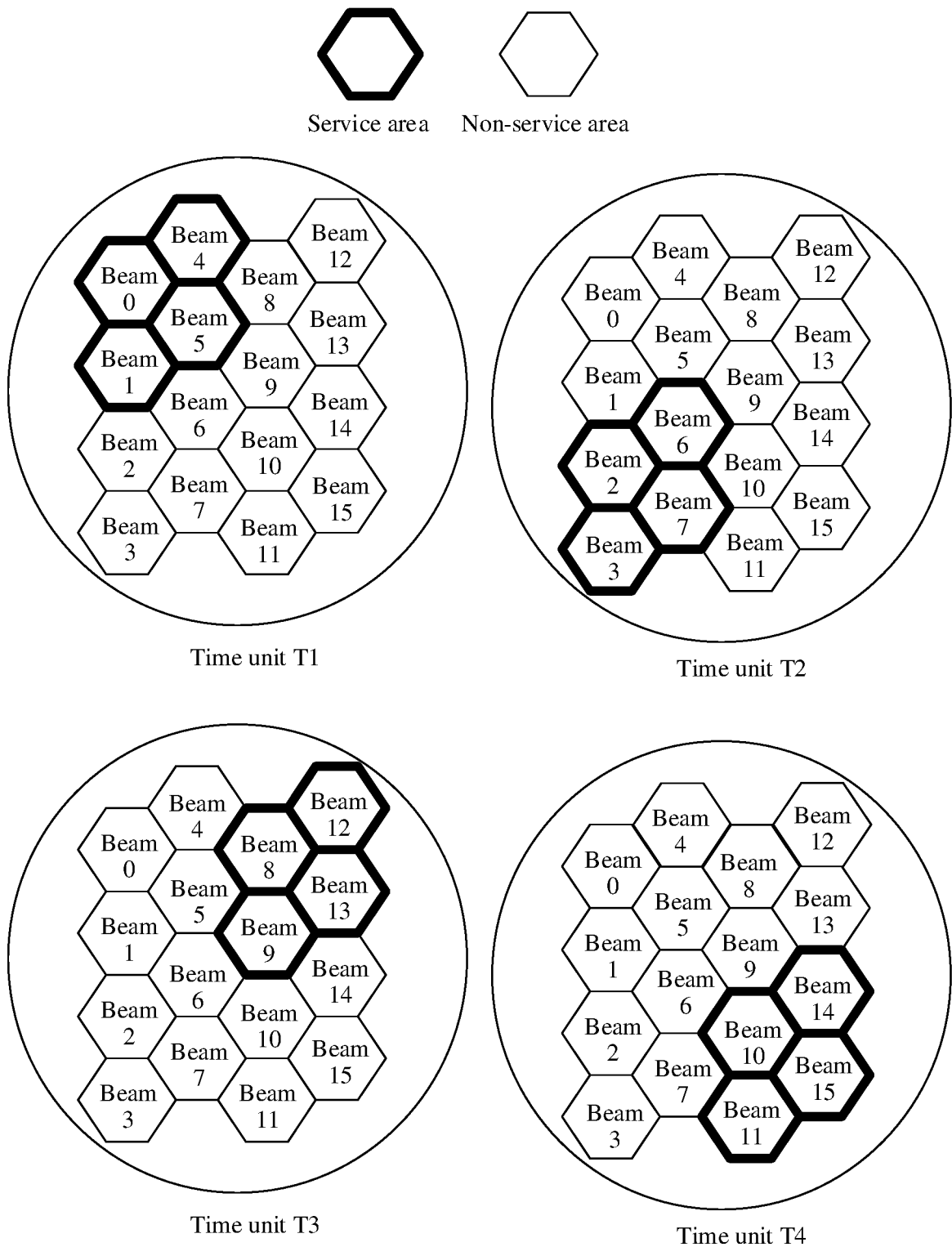
FIG. 3 is a schematic diagram of a beam hopping communication process according to an embodiment.
Figure 7A:
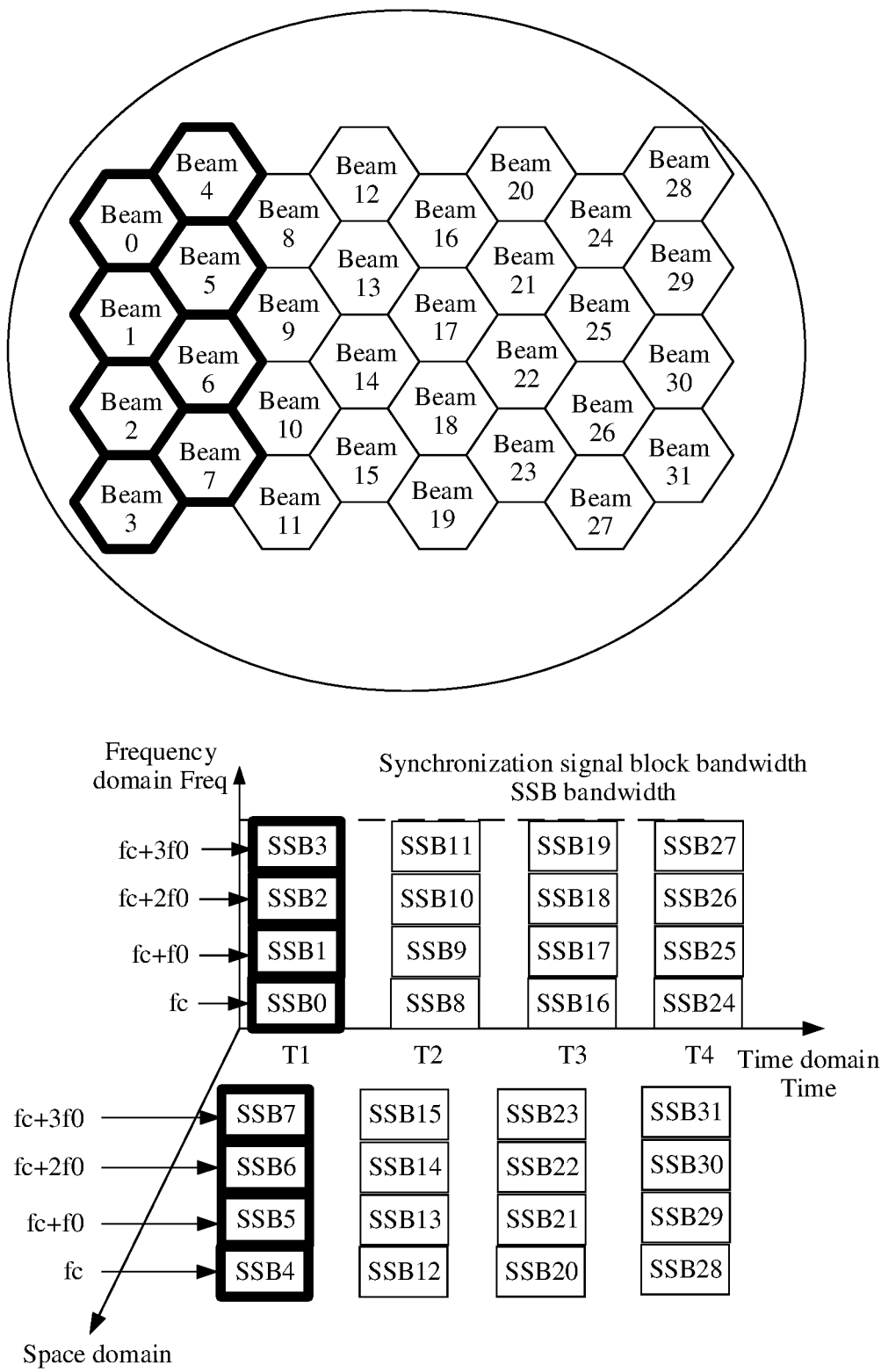
FIG. 7A, FIG. 7B, and FIG. 7C are schematic diagrams of sending an SSB in an inter-frequency manner according to an embodiment.
Figure 7B:
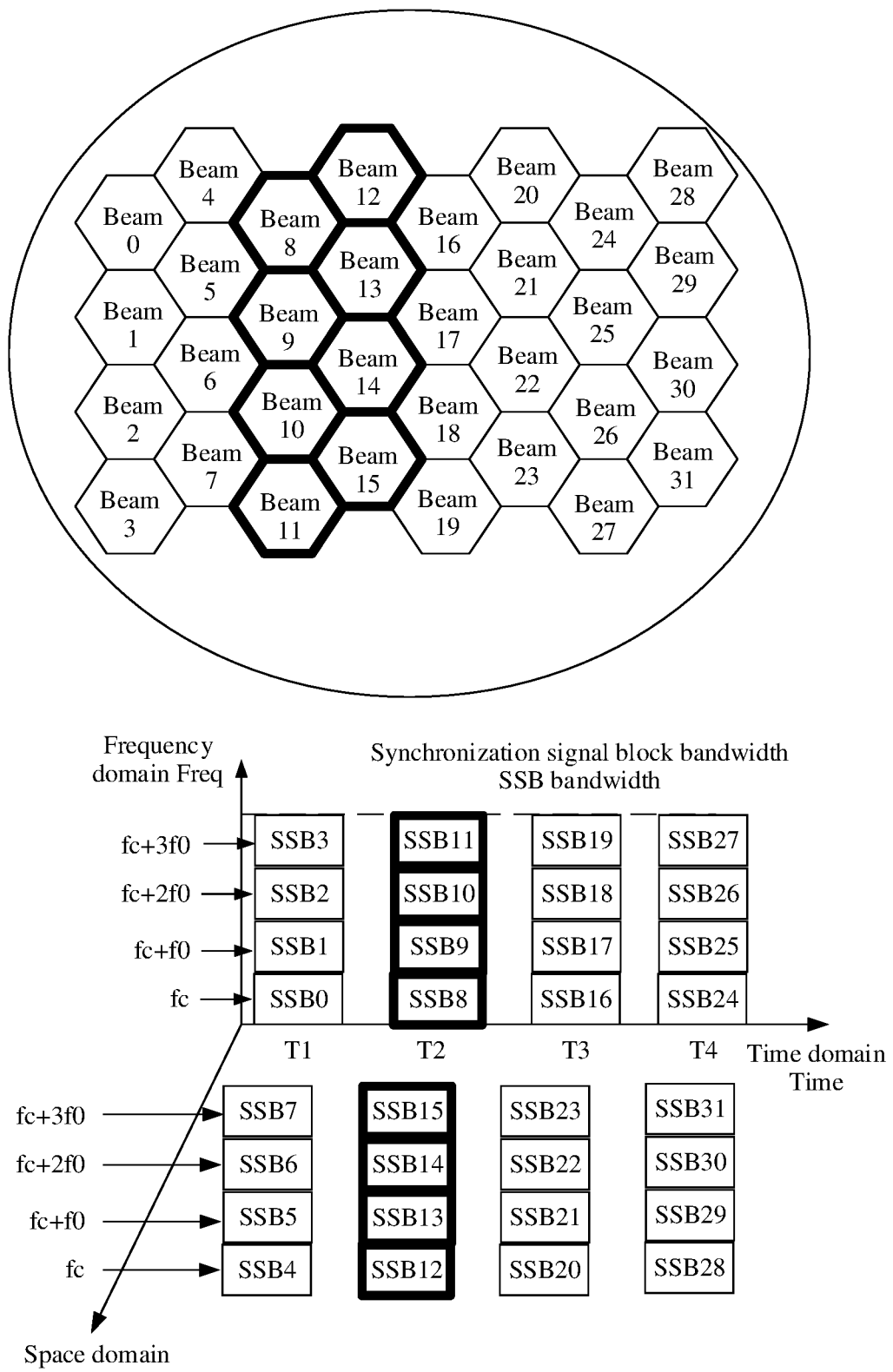

A coverage area of a satellite may reach thousands or even tens of thousands of kilometers, and a coverage area of a beam may reach tens of meters or even thousands of meters. To support wide-area coverage of a satellite, a satellite usually needs to be configured with dozens, hundreds, or even more beams. In order to alleviate contradiction of small load and wide coverage of a single satellite, beam hopping can be used for area coverage. A satellite may be configured with a large quantity of beams to cover a wide area, but only a small quantity of beams are used in a same time unit to cover the area, and a wide area is covered by using a plurality of beams used in different time units. For example, refer to FIG. 3, 16 beams are configured for a satellite to cover a wide area, but only four beams are used in a time unit to cover the area. In a time unit T1, four beams numbered 0, 1, 4, and 5 are used for area coverage. In a time unit T2, four beams numbered 2, 3, 6, and 7 are used for area coverage. By analogy, all areas (that is, areas corresponding to the 16 beams) covered by a single satellite are served in a time division manner of T1, T2, T3, and T4. For another example, as shown in FIG. 7A and FIG. 7B, 32 beams are configured for a satellite to cover a wide area, and only eight beams are used in a time unit to cover the area. In a time unit T1, eight beams numbered 0 to 7 are used for area coverage. In a time unit T2, eight beams numbered 8 to 15 are used for area coverage.

A time unit may be dozens of milliseconds, several milliseconds, or even a smaller time granularity. A plurality of beams that cover an area in a time unit may be referred to as a beam cluster, and the beam cluster may include four or eight beams. For example, the eight beams numbered from 0 to 7 in FIG. 7A are a beam cluster, and eight beams numbered 8 to 15 in FIG. 7B are a beam cluster.

Figure 1:
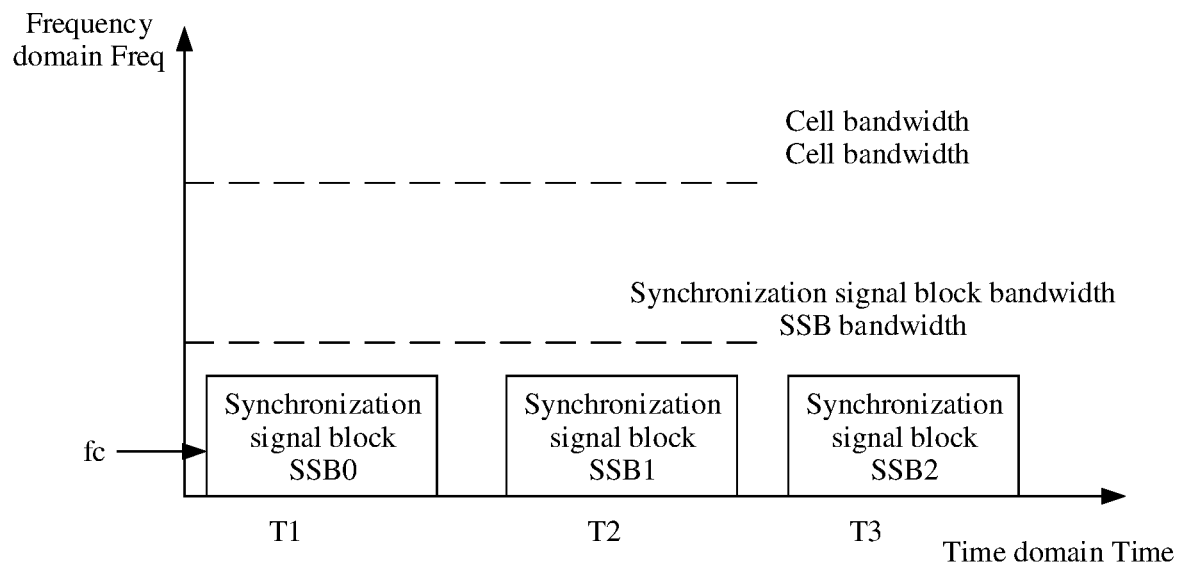
FIG. 1 is a schematic diagram of sending an SSB on a same frequency in a time division manner according to the prior art.

In a satellite communication network, a plurality of beams is configured in a satellite, and each beam may be considered as a beam in a cell or a separate cell. Because a difference between signal strength at a central location and signal strength at an edge location of a satellite beam is small, if communication is performed in a full-frequency reuse manner, strong interference is generated between adjacent beams. Therefore, in a satellite communication system, multicolor reuse (including frequency reuse and polarization reuse) is usually used to reduce interference between satellite beams. Still as shown in FIG. 1, in a time unit T1, four beams 0, 1, 4, and 5 correspond to different frequency bands. For example, system bandwidth may be equally divided into four frequency bands, and center frequencies of each frequency band are respectively f1, f2, f3, and f4. In this case, the beams 0, 1, 4, and 5 respectively correspond to the frequency bands whose center frequencies are f1, f2, f3, and f4. Adjacent beams in a satellite communicate with a terminal device by using different frequencies, to suppress interference.

As shown in FIG. 1, a network device sends an SSB in a time unit by using a frequency. If a time for the network device to complete sending of a configured SSB is long, a time for the terminal device to complete receiving of an SSB is also long. Consequently, a delay in accessing the network device by the terminal device is long. A network device may separately send SSBs by using at least two different frequencies. In this case, the network device may send at least two SSBs in the time unit. Correspondingly, the terminal device may separately receive the SSBs in the time unit by using the at least two different frequencies. If the time for the network device to complete sending of the configured SSB is shortened, a time for the terminal device to access the network device is also shortened.

For ease of understanding of the embodiments, the following describes some terms in the embodiments, to facilitate understanding of a person skilled in the art.

(1) A terminal device, also referred to as user equipment (UE), a mobile station (MS), a mobile terminal (MT), a terminal, or the like, is a device that provides voice and/or data connectivity for a user. For example, terminal devices include a handheld device that has a wireless connection function, a vehicle-mounted device, an internet of things device, and the like. Currently, the terminal device may be a mobile phone, a tablet, a laptop, a personal digital assistant, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, or the like.

(2) A network device is a device configured to communicate with a terminal device, where the network device may be a non-terrestrial network device, for example, a satellite. The network device may also be a terrestrial network device, for example, a base station, an evolved NodeB (eNB) in an LTE system or may be a radio controller in a cloud radio access network (CRAN) scenario. Alternatively, the network device may be a relay station, an access point, an in-vehicle device, a next-generation base station (gNodeB) in a 5G network, or the like. This is not limited in the embodiments.

(3) A core network device includes but is not limited to an access and mobility management function (AMF) network element. The AMF has a control plane function in a core network and provides mobility management and access management functions for a user.

(4) A satellite beam refers to a shape formed on the surface of the earth by an electromagnetic wave emitted by a satellite antenna and is similar to a beam of a flashlight having a range. Alternatively, a signal transmitted by the satellite is not radiated at 360° but is a signal wave transmitted intensively in an azimuth.

Figure 4A:
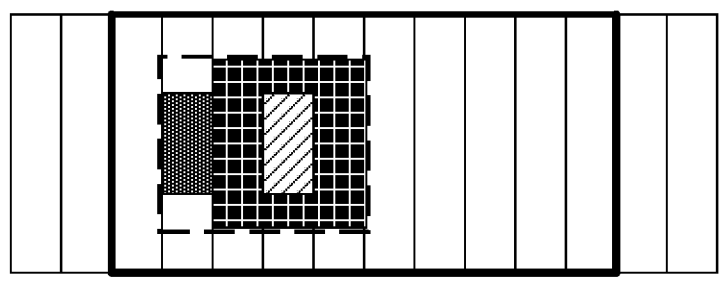
FIG. 4A is a schematic diagram of a structure of a synchronization signal block SSB according to an embodiment.

(5) A synchronization signal block SSB (SS/PBCH block) includes a primary synchronization signal (PSS), a secondary synchronization signal (SSS), and a PBCH. Details are shown in FIG. 4A.

Figure 4B:
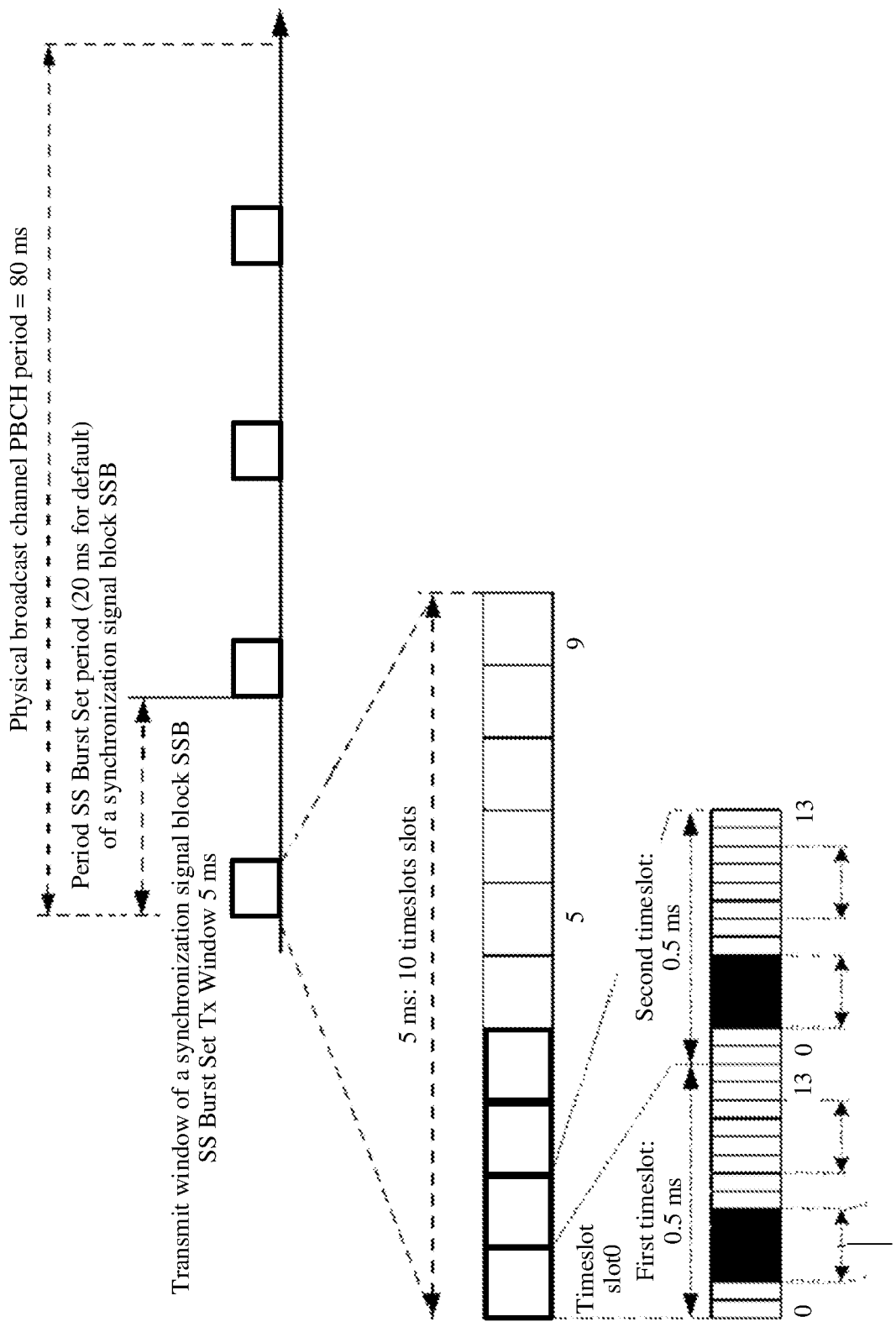
FIG. 4B is a schematic diagram of a process of periodically sending an SSB according to an embodiment.

In the NR system, SSBs are sent periodically. SSBs in a plurality of beam directions in a same period may be limited within 5 ms. As shown in FIG. 4B, a period of an SSB may be 20 ms, and SSBs in a plurality of beam directions are limited within 5 ms. SSBs in the plurality of beam directions may be referred to as an SS burst set in FIG. 4B. In FIG. 4B, a subcarrier spacing SCS of 15 kHz is used. Therefore, a quantity of symbols within 1 ms is 14. Each SS-block occupies four consecutive symbols, two SSBs are included in 1 ms, and there is a symbol spacing between adjacent SSBs.

(6) Beam scanning: If energy is concentrated in a direction in a time unit, a signal can be sent farther in this direction. However, a signal cannot be received in another direction. A signal is sent in another direction in a next time unit. Finally, a plurality of areas is covered by continuously changing a direction of a beam.

The term "and/or" describes an association relationship for describing associated objects and represents that three relationships may exist. For example, A and/or B may represent the following three cases: Only A exists, both A and B exist, and only B exists. The character "l" generally indicates an "or" relationship between the associated objects.

"A plurality of" means two or more.

In the descriptions, terms such as "first" and "second" are merely used for distinguishing and description and cannot be understood as an indication or implication of relative importance or an indication or implication of an order.

In addition, the word "example" in the embodiments is used to represent giving an example, an illustration, or a description. Any embodiment or implementation solution described as an "example" should not be explained as being more preferred or having more advantages than another embodiment or implementation solution. The term "example" is used to present a concept.

It should be noted that a first frequency and a second frequency may be a frequency or may be a frequency band using the first frequency or the second frequency as a center frequency.

In a communication method, a network device may separately send an SSB in a time unit in a period by using at least two different frequencies. The period includes at least two time units. SSBs separately sent in different time units in the period are different. SSBs sent in the time unit by using different frequencies are different. Different SSBs sent in the time unit correspond to different beams. The period may be within 5 ms, 20 ms, or 160 ms. The different beams may be understood as beams having different directions. The different SSBs may be understood as SSBs having different numbers.

The network device repeats the foregoing process in each time unit and repeats a process of a previous period in each period.

Figure 5:
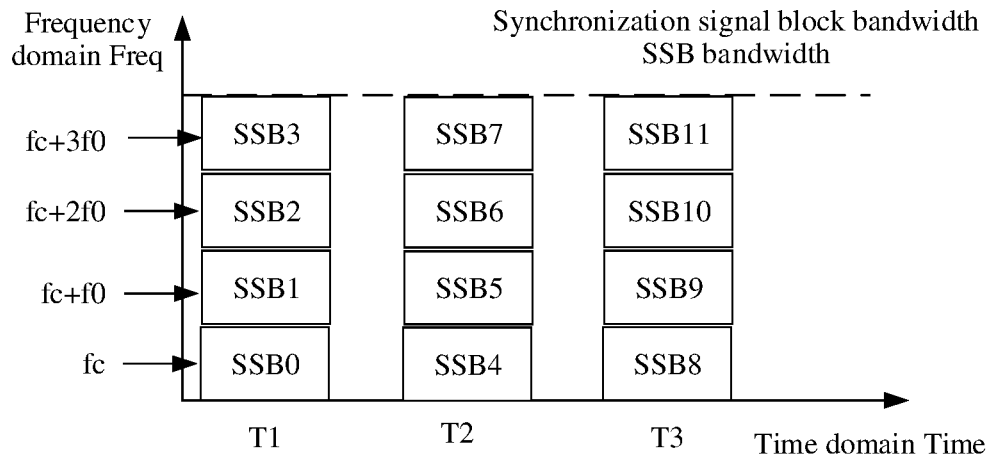
FIG. 5 is a schematic diagram of transmitting an SSB in an inter-frequency manner according to an embodiment.

As shown in FIG. 5, a network device configures 12 SSBs: an SSB 0 to an SSB 11. The network device separately sends the SSBs in a time unit by using four frequencies fc, f0+fc, 2f0+fc, and 3f0+fc. A period includes three time units: T1, T2, and T3. The network device may complete sending of the 12 configured SSBs in the three time units.

At least two different frequencies used by the network device to send the SSBs may be preconfigured by the network device for a single cell or an area. Frequency spacings between the preconfigured two adjacent frequencies may be the same or different.

Optionally, as shown in Table 1, the network device may also configure a frequency of the cell or the area, for example, define the frequency as a first frequency, configure a maximum quantity M of inter-frequencies used by the cell to send the SSBs, and configure a frequency spacing between the two adjacent frequencies. Different first frequencies may correspond to a same frequency spacing or different frequency spacings.

The embodiments may be applicable to a scenario in which there is one first frequency, or a plurality of first frequencies, for example, two first frequencies.

The network device may determine M−1 second frequencies based on the first frequency, where M is an integer greater than or equal to 2. For example, when the first frequency is f1, the network device may determine a second frequency. When the first frequency is f2, the network device may determine three different second frequencies. In addition, at least two different frequencies may be selected from the first frequency and the M−1 second frequencies to send the SSB. Generally, the network device sends the SSB by using all determined different frequencies. When the first frequency is n2, the network device sends the SSB by using the first frequency and the three second frequencies.

TABLE 1

| First frequency | Maximum quantity (M) of inter-frequencies | Frequency spacing between adjacent frequencies |
|---|---|---|
| f1 | 2 | f0 |
| f2 | 4 | f0 |
| ... | ... | ... |

In conclusion, the network device may determine the at least one second frequency based on the first frequency, where any second frequency is different from the first frequency. When there are at least two second frequencies, the at least two second frequencies are different. The at least two different frequencies used to send the SSB belong to a frequency set including the first frequency and the at least one second frequency.

In addition, it should be noted that the maximum quantity M of the inter-frequencies is related to N in N-color reuse of the network device, where N is a frequency reuse factor. Generally, the network device sends the SSB by using the first frequency and all of the second frequencies. In this case, a quantity of the second frequencies is related to the frequency reuse factor N. M is less than or equal to N.

As shown in Table 1, the network device may preset a rule of determining the at least one second frequency based on the first frequency. For example, when the maximum quantity M of the inter-frequencies is set to different values, the maximum quantity M of the inter-frequencies respectively corresponds to a quantity of second frequencies greater than the first frequency and a quantity of second frequencies less than the first frequency.

For example, any second frequency is less than the first frequency. When the first frequency is f2, the at least one second frequency may be f2−(i−1) f0, where a value of i is an integer from 2 to (M−1), and M is an integer greater than or equal to 2.

For example, the any second frequency is greater than the first frequency. When the first frequency is n2, the at least one second frequency may be f2+(i−1) f0, where a value of i is an integer from 2 to (M−1), and M is an integer greater than or equal to 2.

Figure 6:
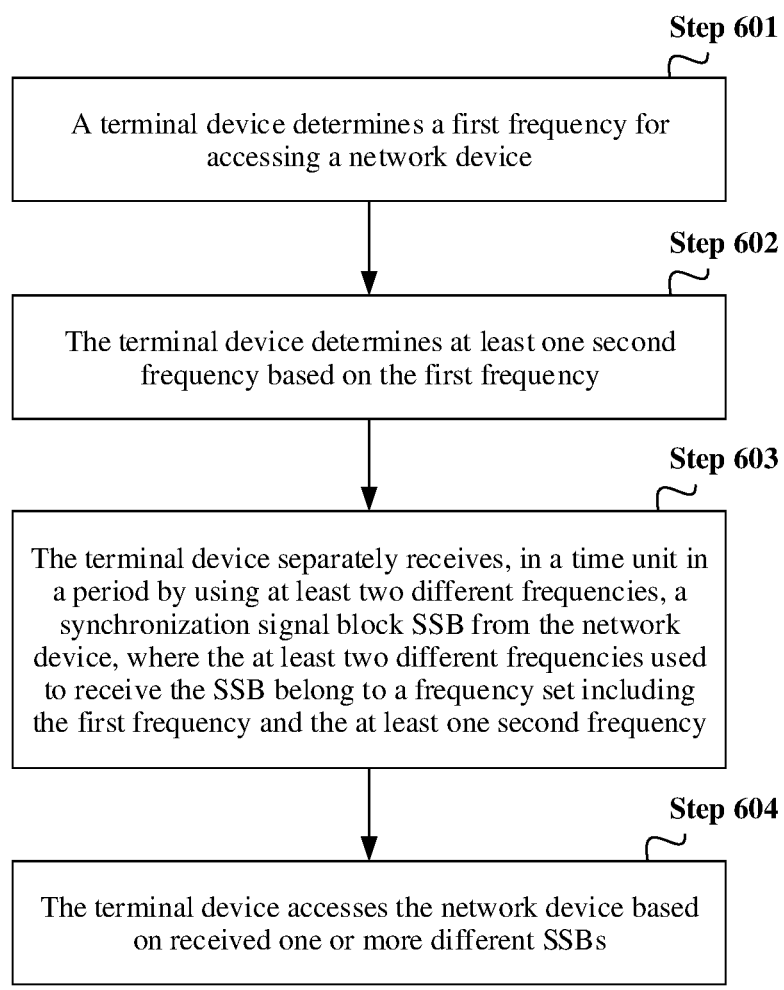
FIG. 6 is a schematic diagram of a communication process in which a terminal device receives an SSB according to an embodiment.

The foregoing describes the manner in which the network device sends the SSB. The following describes a manner in which a terminal device receives an SSB. A process may be shown in FIG. 6.

Step 601: A terminal device determines a first frequency for accessing a network device.

Frequencies respectively corresponding to a plurality of cells or areas are configured for the terminal device. The terminal device may blindly detect an SSB by using the plurality of frequencies. A frequency on which the SSB is first received is referred to as a first frequency. A cell or an area corresponding to the first frequency is a cell or an area in which the terminal device is currently located.

Step 602: The terminal device determines at least one second frequency based on the first frequency.

Any second frequency is different from the first frequency. When there are at least two second frequencies, at least two second frequencies are different.

The terminal device may determine the at least one second frequency based on a preconfiguration, for example, a configuration shown in Table 1, and the first frequency. This manner is the same as the foregoing manner on a network device side. Details are not repeated herein.

Step 603: The terminal device separately receives, in a time unit in a period by using at least two different frequencies, a synchronization signal block SSB from the network device, where the at least two different frequencies used to receive the SSB belong to a frequency set including the first frequency and the at least one second frequency.

The terminal device may select the at least two different second frequencies from the first frequency and the at least one second frequency to receive the SSB from the network device.

Step 604: The terminal device accesses the network device based on received one or more different SSBs.

For example, the network device may be accessed by using an optimal SSB.

The period includes at least two time units. SSBs separately sent in different time units in the period are different. SSBs sent in the time unit by using different frequencies are different. Different SSBs sent in the time unit correspond to different beams.

The different beams may be understood as beams having different directions. That different SSBs may be understood as SSBs having different numbers.

The terminal device can receive the SSB sent by the network device only when the frequency used by the terminal device is the same as the frequency used by the network device and time units are the same.

In conclusion, the terminal device first determines the first frequency for accessing the network device, and then determines the at least one second frequency based on the first frequency. The terminal device selects the at least two different frequencies from the first frequency and the second frequency to separately receive the SSB. In other words, the terminal device may receive at least two SSBs in the time unit. Correspondingly, the network device sends the at least two SSBs in the time unit. If a plurality of SSBs is configured on a network device side, compared with sending the SSB in the time unit, a configured SSB can be sent as soon as possible. In this case, the terminal device may also receive, in a shorter time, the SSB configured by the network device. Therefore, the terminal device can reduce a time for accessing the network device.

In another embodiment, a maximum quantity M of inter-frequencies may be different in a polarization reuse scenario and a non-polarization reuse scenario. For example, as shown in Table 2, M is 2 in the polarization reuse scenario, and M is 4 in the non-polarization reuse scenario.

TABLE 2

| First frequency | Network type | Polarization reuse | Maximum quantity (M) of inter-frequencies | Frequency spacing between adjacent frequencies |
|---|---|---|---|---|
| f3 | Terrestrial network TN | No | 1 | 0 |
| f1 | Non-terrestrial network NTN | Yes | 2 | f0 |
| f2 | Non-terrestrial network NTN | No | 4 | f0 |
| ... | ... | ... | ... | ... |

In the polarization reuse scenario, when the first frequency supports polarization reuse, the terminal device and the network device may determine the second frequency based on the first frequency, and the determined second frequency also supports polarization reuse.

In the non-polarization reuse scenario, when the first frequency does not support polarization reuse, the terminal device and the network device may determine at least one second frequency and at most three second frequencies based on the first frequency, and the determined second frequency does not support polarization reuse either.

In addition, two different network types, namely, a terrestrial network (NT) and a non-terrestrial network (NTN), namely, a satellite network, are further configured in Table 2.

In the terrestrial network, a network device usually communicates with a terminal device in a full-frequency coverage manner, and a maximum quantity M of inter-frequencies is 1.

In the non-terrestrial network (NTN), that is, a satellite communication network, frequency interference between satellite beams is usually reduced in a multicolor frequency reuse manner, and a quantity M of inter-frequencies may be greater than or equal to 2. In addition, when multi-color reuse is used, bandwidth for sending an SSB decreases, and throughput performance decreases. When M is 2, 3, or 4, the performance is optimal.

In another embodiment, the network device may separately send, in the time unit by using the at least two different frequencies, the SSB. In other words, one SSB is sent by using one frequency.

Alternatively, the network device separately sends, in the time unit by using the at least two different frequencies, the two different SSBs. In other words, two SSBs are sent by using one frequency. Beams that correspond to the two different SSBs and that are sent by using a frequency in the time unit are distinguished by using a space domain.

A beam hopping satellite may use a plurality of different beams in a beam cluster to send an SSB in a time unit. For example, the beam cluster includes four different beams, or includes eight different beams. Generally, a quantity of beams in the beam cluster is greater than or equal to a maximum quantity M of inter-frequencies.

For example, as shown in FIG. 7A and FIG. 7B, the beam hopping satellite may simultaneously support eight beams to send SSBs. A coverage area of the satellite may include 32 beam areas, that is, 32 SSBs are configured. The satellite uses four frequencies of fc, fc+f0, fc+2*f0, and fc+3*f0 to send the SSBs. In a time unit T1, the satellite sends an SSB 0 to an SSB 7 respectively by using a beam 0 to a beam 7. In a time unit T2, the satellite sends an SSB8 to an SSB15 respectively by using a beam 8 to a beam 15. In this case, two different SSBs may be sent at one frequency in one time unit, and beams (for example, the beam 0 and the beam 4, or the beam 1 and the beam 5, or the beam 2 and the beam 6) respectively corresponding to the two different SSBs may be distinguished by using different space domains.

In the conventional technology, different SSBs correspond to different beams. In another embodiment, beams corresponding to different SSBs that are sent by the network device within adjacent time units by using a same frequency may be the same or may be different.

When there is a small quantity of terminal users in an area, a camping time of a beam covering the area is short. When the network device sends the SSB, if a camping time of a beam currently used for sending the SSB is long, the camping time may be postponed to a next time unit for sending the SSB. In this case, different SSBs sent by the network device in adjacent time units correspond to a same beam. If a camping time of the beam currently used for sending the SSB is short, the camping time is not postponed to the next time unit for sending the SSB, and different SSBs sent by the network device in adjacent time units correspond to different beams.

Figure 7C:
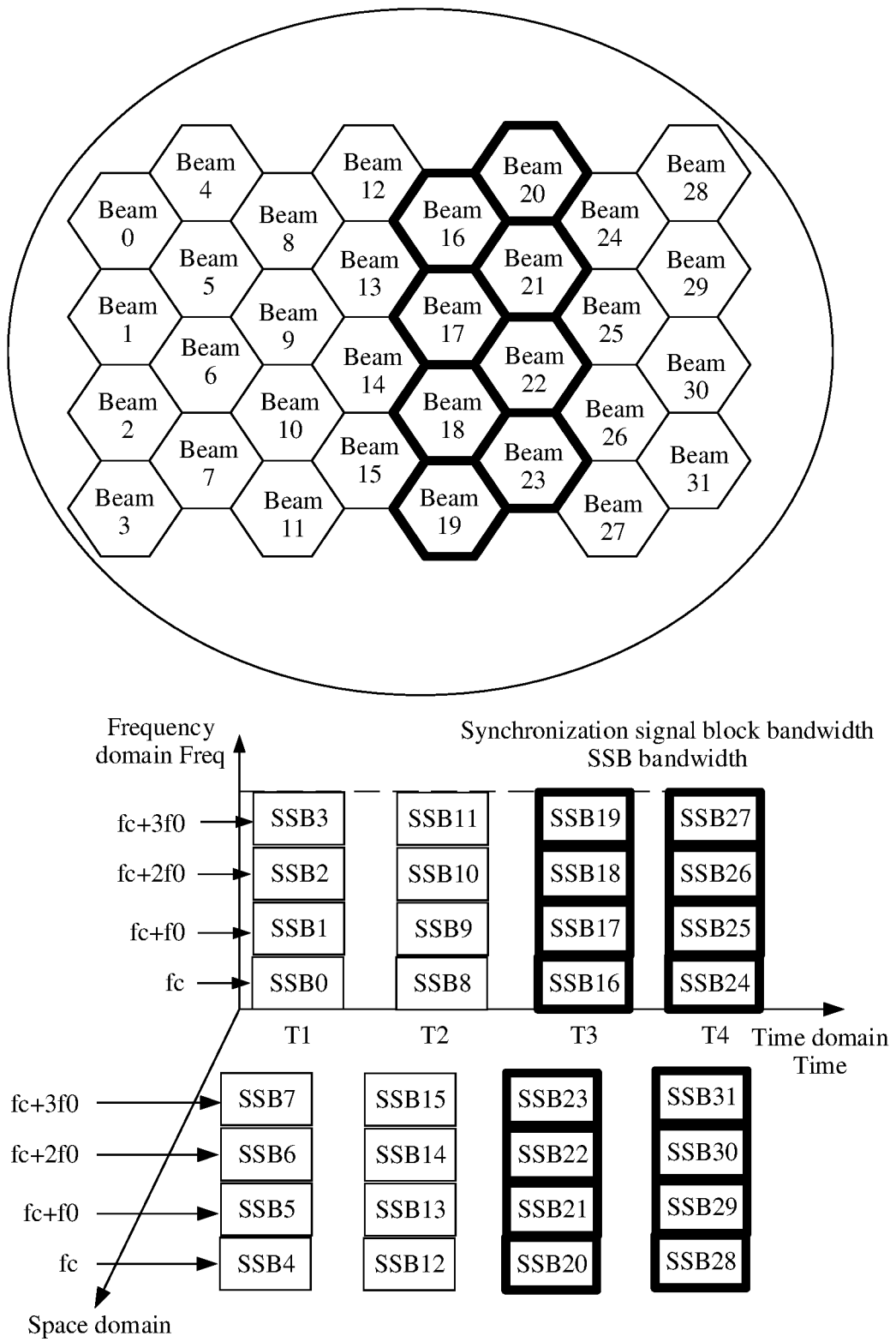

As shown in FIG. 7C, a cluster of beams numbered 16 to 23 camp in an area covered by the cluster for a long time, for example, camp in a same area in both a time unit T3 and a time unit T4. In this case, the network device sends, in the time unit T3 and the time unit T4, an SSB to the covered area by using beams in the same cluster, that is, eight beams numbered 16 to 23. The network device may send an SSB16 and an SSB24 by using the beam whose number is 16, sends an SSB17 and an SSB25 by using the beam whose number is 17, sends an SSB18 and an SSB26 by using the beam whose number is 18, and so on.

Correspondingly, beams corresponding to different SSBs that are received by using a same frequency in adjacent time units are the same or different. The terminal device may further determine whether the beams corresponding to the different SSBs that are received by using the same frequency in the adjacent time units are the same. When determining that the different SSBs correspond to the same beams, the terminal device may perform soft combination on the SSBs corresponding to the same beam, to improve demodulation performance, or may combine resources corresponding to the SSBs corresponding to the same beam, to improve resource utilization. For example, access resources of physical random access channels (PRACH) corresponding to the same SSBs are combined.

When the terminal device determines whether the beams corresponding to the different SSBs that are received by using the same frequency in the adjacent time units are the same, the network device may use a first indication in the SSBs to indicate homogeneity between the beams corresponding to the SSBs. In other words, the first indication indicates whether two SSBs in adjacent time units with a same frequency and in a same space domain correspond to a same beam. The terminal device determines, based on the first indication, whether the beams corresponding to the different SSBs that are received by using the same frequency in the adjacent time units are the same.

The first indication may be an original reserved bit in the SSB. Alternatively, an original SSB format may be updated by adding a new bit to an original SSB, to carry the first indication. The first indication may occupy one bit or may occupy more bits.

For example, the received SSB includes a first indication, where the first indication indicates whether a beam corresponding to an SSB sent by the network device by using a third frequency in a first time unit is the same as another beam corresponding to an SSB sent by using the third frequency in a second time unit. The second time unit is adjacent to the first time unit, and the third frequency is any one of the at least two different frequencies. The first time unit is earlier than the second time unit, or the first time unit is later than the second time unit. For example, the first time unit is T1, and the second time unit is T2. For another example, the first time unit is T4, and the second time unit is T3.

The terminal device may determine, based on the first indication in the SSB, whether a beam corresponding to an SSB received by the terminal device by using the third frequency in the first time unit is the same as a beam corresponding to another SSB received by the terminal device by using the third frequency in the second time unit.

As shown in FIG. 7C, an SSB 18 may include the first indication, and the first indication may indicate whether a beam corresponding to the SSB 18 is the same as a beam corresponding to an SSB 26 or indicate whether a beam corresponding to the SSB 18 is the same as a beam corresponding to an SSB 10. The first indication in the SSB 18 cannot indicate whether a beam corresponding to the SSB 18 is the same as a beam corresponding to an SSB 25, because a frequency on which the SSB 18 is sent is different from a frequency on which the SSB 25 is sent.

A beam cluster may camp on an area for three or more time units. In the three time units, although the network device sends a plurality of SSBs, the terminal device may not receive all the SSBs. For example, as shown in FIG. 7C, a beam cluster camps for three time units, for example, T2, T3, and T4. In this case, beams corresponding to the SSB10, the SSB18, and the SSB26 are the same, beams corresponding to an SSB11, an SSB19, and an SSB27 are the same, . . . , and so on. The terminal device receives the SSB10 and the SSB11 in the time unit T2, receives only the SSB19 in the time unit T3, and receives only the SSB26 in the time unit T4. When the first indication included in the SSB 19 indicates that the SSB 19 and the SSB 11 correspond to a same beam, and the first indication included in the SSB 26 indicates that the SSB 26 and the SSB 18 (the SSB 18 is actually not received) correspond to a same beam, the terminal device may infer that the SSB 26 and the SSB 10 correspond to a same beam, the SSB26 and the SSB10 of the same beam can be soft combined to improve demodulation performance, and corresponding resources can be combined to improve resource utilization.

For another example, the first indication included in the SSB may indicate that different SSBs sent by the network device in different time units by using a same frequency correspond to a same beam. In this case, in one period, different SSBs sent by using a same frequency in any two adjacent time units correspond to a same beam.

The first indication may be included in a master information block (MIB) of the SSB, and a MIB information element is shown as follows:

```
-- ASN1STOP -- ASN1START
-- MIB-START
MIB ::=              SEQUENCE {
    Beam-relation       ENUMERATED {0,1}
                                         ...
}
-- TAG-MIB-STOP
-- ASN1STOP
```

Beam-relation ENUMERATED {0, 1} may represent the first indication described above.

In another embodiment, the terminal device may not receive the SSB in a first time unit in a period. In other words, the terminal device does not know a SSB sent by the network device, that is, does not know a number of the SSB. Based on this, the SSB may include a second indication, and the second indication indicates space domain information and time unit information of the SSB sent by the network device. Generally, when receiving the SSB, the terminal device knows a frequency at which the SSB is received. A bit does not need to be set in the SSB to indicate frequency information of the SSB. Definitely, the bit of the frequency information may also be set.

The terminal device knows a quantity of SSBs configured by the network device, a quantity of time units in a period, and a quantity of adjacent frequencies when the network device sends the SSBs. Based on this, the terminal device may obtain the number of the SSB based on the time unit information, the frequency information, and the space domain information that are corresponding to the SSB.

It may also be understood that the second indication indicates the number of the SSB, and the number of the SSB is indicated by using the time unit information, the frequency information, and the space domain information.

When the period includes two time units, one bit may be used to indicate two different time units. When the period includes three or four time units, two bits may be used to indicate different time units. When the period includes five to eight time units, three bits may be used to indicate different time units.

Similarly, one bit may indicate two different space domains, and two bits may indicate a maximum of four different space domains, . . . , and so on.

As shown in Table 3, with reference to FIG. 7C, an SSB 16 and an SSB 20 appear in a time unit T3, and 10 indicates the time unit T3. An SSB 24 appears in a time unit T4, and 11 indicates the time unit T4. Space domains of the SSB 16 and the SSB 20 are different and are respectively indicated by using 0 and 1. In frequency domain, a frequency domain location may be implicitly indicated based on a frequency of the SSB. In other words, the SSB16 corresponds to a frequency 00, and an SSB17 corresponds to a frequency 01. In a space domain, explicit bits may be used to indicate different beams (for example, beams corresponding to the SSB16 and the SSB20) that are at a same time and at a same frequency.

TABLE 3

| SSB number | Time unit | Space domain | Frequency (implicit) |
|---|---|---|---|
| SSB16 | 10 | 0 | 00 |
| SSB20 | 10 | 1 | 00 |
| SSB24 | 11 | 0 | 00 |
| . . . | . . . | . . . | . . . |

The foregoing describes the communication method, and a communication apparatus in the embodiments. The method and the apparatus are based on a same idea. Because problem-resolving principles of the method and the apparatus are similar, mutual reference may be made to implementations of the apparatus and the method, and repeated parts are not described again.

Figure 8:
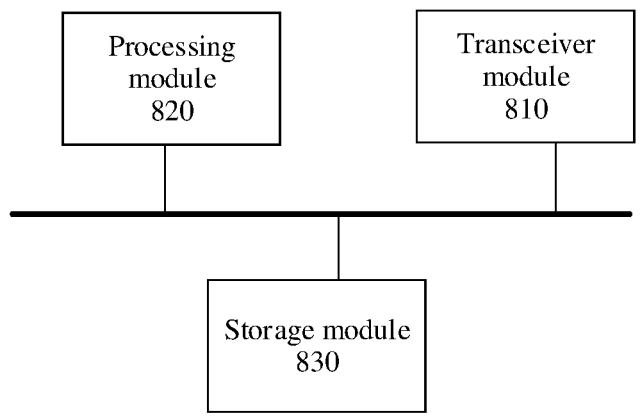
FIG. 8, FIG. 9, FIG. 10, and FIG. 11 are schematic diagrams of a communication apparatus according to an embodiment.

Based on the same idea as the foregoing communication method, as shown in FIG. 8, a communication apparatus 800 is provided. The communication apparatus 800 can perform the steps performed by the terminal device in the foregoing method. To avoid repetition, details are not described herein again. The communication apparatus 800 may be a network device or may be a chip used in a network device. The communication apparatus 800 includes a transceiver module 810 and a processing module 820, and optionally, further includes a storage module 830. The processing module 820 may be separately connected to the storage module 830 and the transceiver module 810, or the storage module 830 may be connected to the transceiver module 810.

The storage module 830 is configured to store a computer program.

For example, the processing module 820 is configured to: determine a first frequency for accessing a network device; determine at least one second frequency based on the first frequency, where any second frequency is different from the first frequency, and when there are at least two second frequencies, the at least two second frequencies are different;

and separately receive, in a time unit of a period through the transceiver module 810, a synchronization signal block SSB from the network device by using at least two different frequencies, where the at least two different frequencies used to receive the SSB belong to a frequency set including the first frequency and the at least one second frequency.

The processing module 820 is further configured to access the network device based on received one or more different SSBs.

The period includes at least two time units. SSBs separately sent in different time units in the period are different. SSBs sent in the time unit by using different frequencies are different. Different SSBs sent in the time unit correspond to different beams.

In a possible implementation, the processing module 820 is further configured to determine whether beams corresponding to different SSBs that are received by using a same frequency in adjacent time units are the same.

In a possible implementation, when being configured to determine whether the beams corresponding to the different SSBs that are received by using the same frequency in the adjacent time unit are the same, the processing module 820 is configured to:

The received SSB includes a first indication, where the first indication indicates whether a beam corresponding to an SSB sent by the network device by using a third frequency in a first time unit is the same as a beam corresponding to an SSB sent by using the third frequency in a second time unit, the second time unit is adjacent to the first time unit, and the third frequency is any one of the at least two different frequencies; and determine, based on the first indication, whether the beam corresponding to the SSB received by using the third frequency in the first time unit is the same as the beam corresponding to the SSB received by using the third frequency in the second time unit.

In a possible implementation, when determining the at least one second frequency based on the first frequency, the processing module 820 is configured to: determine the second frequency based on the first frequency, where the first frequency supports polarization reuse; or determine at least one or a maximum of three second frequencies based on the first frequency, where the first frequency does not support polarization reuse.

In a possible implementation, when separately receiving, in the time unit through the transceiver module 810 and by using the at least two different frequencies, the SSB from the network device, the processing module 820 is configured to: separately receive, in the time unit through the transceiver module 810, the SSB from the network device by using the at least two different frequencies; or separately receive, in the time unit, two different SSBs from the network device by using the at least two different frequencies, where beams respectively corresponding to the two different SSBs that are sent by using a frequency in the time unit are distinguished by using a space domain.

In a possible implementation, the SSB includes a second indication, and the second indication indicates space domain information and time unit information of the SSB sent by the network device.

Figure 9:
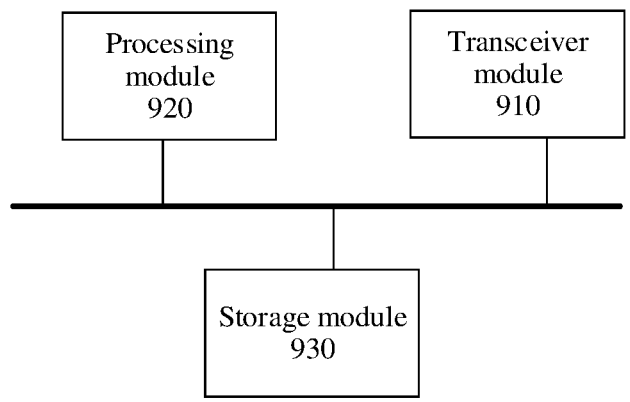

Based on the same idea as the foregoing communication method, as shown in FIG. 9, a communication apparatus 900 is provided. The communication apparatus 900 can perform the steps performed by the network device in the foregoing method. To avoid repetition, details are not described herein again. The communication apparatus 900 may be a network device or may be a chip used in a network device. The communication apparatus 900 includes a transceiver module 910 and a processing module 920, and optionally, further includes a storage module 930. The processing module 920 may be separately connected to the storage module 930 and the transceiver module 910, or the storage module 930 may be connected to the transceiver module 910.

The storage module 930 is configured to store a computer program.

For example, the processing module 920 is configured to separately send a synchronization signal block SSB in a time unit of a period through a transceiver module 910 and by using at least two different frequencies. The period includes at least two time units. SSBs separately sent in different time units in the period are different. SSBs sent in the time unit by using different frequencies are different. Different SSBs sent in the time unit correspond to different beams.

In a possible implementation, the processing module 920 is further configured to determine at least one second frequency based on a first frequency, where any second frequency is different from the first frequency. When there are at least two second frequencies, the at least two second frequencies are different. The at least two different frequencies used to send the SSB belong to a frequency set including the first frequency and the at least one second frequency.

In a possible implementation, different SSBs sent by using a same frequency in adjacent time units correspond to a same beam or different beams.

In a possible implementation, the SSB includes a first indication. The first indication indicates whether a beam corresponding to an SSB sent by the network device by using a third frequency in a first time unit is the same as a beam corresponding to an SSB sent by using the third frequency in a second time unit. The second time unit is adjacent to the first time unit. The third frequency is any one of the at least two different frequencies.

In a possible implementation, when determining the at least one second frequency based on the first frequency, the processing module 920 is configured to: determine the second frequency based on the first frequency, where the first frequency supports polarization reuse; or determine at least one or a maximum of three second frequencies based on the first frequency, where the first frequency does not support polarization reuse.

In a possible implementation, when separately sending, in the time unit through the transceiver module 910 and by using the at least two different frequencies, the SSB, the processing module 920 is configured to: separately send, in the time unit through the transceiver module 910 and by using the at least two different frequencies, the SSB; or separately send, in the time unit by using the at least two different frequencies, the two different SSBs, where beams respectively corresponding to the two different SSBs that are sent by using a frequency in the time unit are distinguished by using a space domain.

In a possible implementation, the SSB includes a second indication, and the second indication indicates space domain information and time unit information of the SSB sent by the network device.

Figure 10:
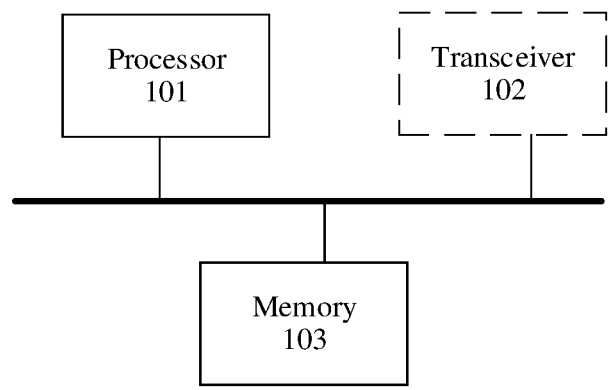

FIG. 10 is a schematic block diagram of a communication apparatus 100 according to an embodiment. It should be understood that the communication apparatus 100 can perform steps performed by a terminal device. To avoid repetition, details are not described herein again. The communication apparatus 100 includes a processor 101 and a memory 103. The processor 101 and the memory 103 are electrically coupled.

The memory 103 is configured to store a computer program or instructions.

The processor 101 is configured to execute some or all of the computer program instructions in the memory 103. When the some or all of the computer program instructions are executed, the apparatus determines at least two different frequencies, and receives an SSB from a network device by using the at least two different frequencies.

Optionally, the communication apparatus 100 further includes a transceiver 102, configured to communicate with another device. For example, the transceiver 102 is configured to receive the SSB sent by the network device.

It should be understood that the communication apparatus 100 shown in FIG. 10 may be a chip or a circuit. For example, the communication apparatus 100 is a chip or a circuit disposed in the terminal device. Alternatively, the transceiver 102 may be a communication interface. The transceiver includes a receiver and a transmitter. Further, the communication apparatus 100 may further include a bus system.

The processor 101, the memory 103, and the transceiver 102 are connected by using a bus system. The processor 101 is configured to execute the instruction stored in the memory 103, to control the transceiver to receive a signal and send a signal, to complete the steps of the terminal device in the communication method. The memory 103 may be integrated into the processor 101 or may be disposed independent of the processor 101.

In an implementation, it may be considered that functions of the transceiver 102 are implemented by using a transceiver circuit or a dedicated transceiver chip. It may be considered that the processor 101 may be implemented by using a dedicated processing chip, a processing circuit, a processor, or a general-purpose chip.

Figure 11:
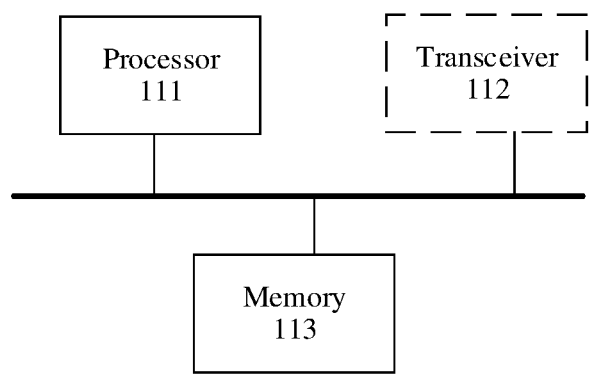

FIG. 11 is a schematic block diagram of a communication apparatus 110 according to an embodiment. It should be understood that the communication apparatus 110 can perform steps performed by a network device. To avoid repetition, details are not described herein again. The communication apparatus 110 includes a processor 111 and a memory 113. The processor 111 and the memory 113 are electrically coupled.

The memory 113 is configured to store a computer program or instructions.

The processor 111 is configured to execute some or all of the computer program instructions in the memory 113. When the some or all of the computer program instructions are executed, the apparatus determines at least two different frequencies, and sends an SSB to a terminal device by using the at least two different frequencies.

Optionally, the communication apparatus 100 further includes a transceiver 112, configured to communicate with another device. For example, the transceiver 112 is configured to send the SSB to the terminal device.

It should be understood that the communication apparatus 110 shown in FIG. 11 may be a chip or a circuit. For example, the communication apparatus 110 is a chip or a circuit disposed in the network device. Alternatively, the transceiver 112 may be a communication interface. The transceiver includes a receiver and a transmitter. Further, the communication apparatus 110 may include a bus system.

The processor 111, the memory 113, and the transceiver 112 are connected by using a bus system. The processor 111 is configured to execute the instruction stored in the memory 113, to control the transceiver to receive a signal and send a signal, to complete the steps of the network device in the communication method. The memory 113 may be integrated into the processor 111 or may be disposed independent of the processor 111.

In an implementation, it may be considered that functions of the transceiver 112 are implemented by using a transceiver circuit or a dedicated transceiver chip. It may be considered that the processor 111 may be implemented by using a dedicated processing chip, a processing circuit, a processor, or a general-purpose chip.

The processor may be a central processing unit (CPU), a network processor (NP), or a combination of the CPU and the NP.

The processor may further include a hardware chip or another general purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or any combination thereof. The general-purpose processor may be a microprocessor, or the processor may be any conventional processor or the like.

It may be understood that the memory mentioned in the embodiments may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described is intended to include but is not limited to these memories and any memory of another proper type.

An embodiment provides a non-transitory computer storage medium. The non-transitory computer storage medium stores a computer program. The computer program includes instructions used to perform the foregoing communication method.

An embodiment provides a computer program product including instructions. When the computer program product runs on a computer, the computer is enabled to perform the communication method provided above.

A person skilled in the art should understand that the embodiments may be provided as a method, a system, or a computer program product. Therefore, the embodiments may use hardware, software embodiments, or a combination of software and hardware. Moreover, the embodiments may use a form of a computer program product that is implemented on one or more computer-usable storage media (including but not limited to a disk memory, a CD-ROM, an optical memory, and the like) that include computer usable program code.

The embodiments are described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a non-transitory computer-readable memory that can instruct the computer or any other programmable data processing device to work in a manner so that the instructions stored in the non-transitory computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

Although some embodiments have been described, persons skilled in the art can make changes and modifications to these embodiments once they learn the basic concept. Therefore, the following claims are intended to be construed as to cover the embodiments and all changes and modifications falling within the scope of the claims.

Persons skilled in the art can make various modifications and variations to embodiments without departing from the spirit and scope of the embodiments. In this way, modifications and variations to the embodiments fall within the scope of protection defined by the following claims and their equivalent technologies.

The invention claimed is:

1. A method comprising:
    determining, by a terminal device, a first frequency for accessing a network device;
    determining, by the terminal device, at least one second frequency based on the first frequency, wherein any second frequency is different from the first frequency, and, when there are at least two second frequencies, the at least two second frequencies are different;
    separately receiving, by the terminal device in a time unit in a period by using at least two different frequencies, a synchronization signal block (SSB) from the network device, wherein the at least two different frequencies used to receive the SSB belong to a frequency set comprising the first frequency and the at least one second frequency and a quantity of frequencies used to receive the SSB is related to a frequency reuse factor;
    accessing, by the terminal device, the network device based on received one or more different SSBs, wherein the period comprises at least two time units, SSBs separately received in different time units in the period are different, SSBs received in the time unit by using different frequencies are different, and different SSBs received in the time unit correspond to different beams;
    determining, by the terminal device, whether beams corresponding to different SSBs that are received by using a same frequency in adjacent time units are the same, wherein the SSB received by the terminal device comprises a first indication, wherein the first indication indicates whether a beam corresponding to an SSB sent by the network device by using a third frequency in a first time unit is the same as a beam corresponding to an SSB sent by using the third frequency in a second time unit, the second time unit is adjacent to the first time unit, and the third frequency is any one of the at least two different frequencies; and
    determining, by the terminal device based on the first indication, whether the beam corresponding to the SSB received by using the third frequency in the first time unit is the same as the beam corresponding to the SSB received by using the third frequency in the second time unit.

2. The method according to claim 1, wherein determining, by the terminal device, the at least one second frequency based on the first frequency further comprises:
    determining, by the terminal device, the at least one second frequency based on the first frequency, wherein the first frequency supports polarization reuse; or
    determining, by the terminal device, at least one or at most three second frequencies based on the first frequency, wherein the first frequency does not support polarization reuse.

3. The method according to claim 1, wherein separately receiving, in the time unit by using the at least two different frequencies, the SSB from the network device further comprises:
    separately receiving, in the time unit by using the at least two different frequencies, the SSB from the network device; or
    separately receiving, in the time unit by using the at least two different frequencies, two different SSBs from the network device, wherein beams that correspond to the two different SSBs and that are received by using a frequency in the time unit are distinguished by using a space domain.

4. The method according to claim 1, wherein different SSBs comprise different numbers.

5. The method according to claim 1, wherein the SSB comprises a second indication, and the second indication indicates space domain information and time unit information of the SSB sent by the network device.

6. The method according to claim 5, wherein the second indication further indicates frequency information of the SSB sent by the network device.

7. The method according to claim 6, wherein adjacent frequencies in the at least two different frequencies have a same frequency spacing.

8. A method comprising:
    separately sending, by a network device, a synchronization signal block (SSB) in a time unit of a period by using at least two different frequencies and a quantity of frequencies used to receive the SSB is related to a frequency reuse factor, the period comprises at least two time units, SSBs separately sent in different time units in the period are different, SSBs sent in the time unit by using different frequencies are different, and different SSBs sent in the time unit correspond to different beams
    determining, by the terminal device, whether beams corresponding to different SSBs that are received by using a same frequency in adjacent time units are the same, wherein the SSB received by the terminal device comprises a first indication, wherein the first indication indicates whether a beam corresponding to an SSB sent by the network device by using a third frequency in a first time unit is the same as a beam corresponding to an SSB sent by using the third frequency in a second time unit, the second time unit is adjacent to the first time unit, and the third frequency is any one of the at least two different frequencies; and determining, by the terminal device based on the first indication, whether the beam corresponding to the SSB received by using the third frequency in the first time unit is the same as the beam corresponding to the SSB received by using the third frequency in the second time unit.

9. The method according to claim 8, further comprising:
determining, by the network device, at least one second frequency based on a first frequency, wherein any second frequency is different from the first frequency;
when there are at least two second frequencies, the at least two second frequencies are different; and
the at least two different frequencies used to send the SSB belong to a frequency set comprising the first frequency and the at least one second frequency.

10. The method according to claim 9, wherein determining, by the network equipment, the at least one second frequency based on a first frequency further comprises:
determining, by the network device, the at least one second frequency based on the first frequency, wherein the first frequency supports polarization reuse; or
determining, by the network device, at least one or at most three second frequencies based on the first frequency, wherein the first frequency does not support polarization reuse.

11. The method according to claim 8, wherein different SSBs sent by using a same frequency in adjacent time units correspond to a same beam or different beams.

12. The method according to claim 8, wherein the SSB comprises a first indication, the first indication indicates whether a beam corresponding to an SSB sent by the network device by using a third frequency in a first time unit is the same as a beam corresponding to an SSB sent by using the third frequency in a second time unit, the second time unit is adjacent to the first time unit, and the third frequency is any one of the at least two different frequencies.

13. The method according to claim 8, wherein separately sending the SSB in the time unit of the period by using the at least two different frequencies further comprises:
separately sending, in the time unit by using the at least two different frequencies, the SSB; or
separately sending, in the time unit by using the at least two different frequencies, two different SSBs, wherein beams respectively corresponding to the two different SSBs that are sent by using a frequency in the time unit are distinguished by using a space domain.

14. The method according to claim 8, wherein different SSBs comprise different numbers.

15. The method according to claim 8, wherein the SSB comprises a second indication, and the second indication indicates space domain information and time unit information of the SSB sent by the network device.

16. The method according to claim 15, wherein the second indication further indicates frequency information of the SSB sent by the network device.

17. The method according to claim 16, wherein adjacent frequencies in the at least two different frequencies have a same frequency spacing.

18. A communication apparatus comprising:
a processing module, configured to:
determine a first frequency for accessing a network device;
determine at least one second frequency based on the first frequency, wherein any second frequency is different from the first frequency, and when there are at least two second frequencies, the at least two second frequencies are different;
separately receive, in a time unit of a period through a transceiver module, a synchronization signal block (SSB) from the network device by using at least two different frequencies, wherein the at least two different frequencies used to receive the SSB belong to a frequency set comprising the first frequency and the at least one second frequency and a quantity of frequencies used to receive the SSB is related to a frequency reuse factor;
access the network device based on received one or more different SSBs, wherein the period comprises at least two time units, SSBs separately received in different time units in the period are different, SSBs received in the time unit by using different frequencies are different, and different SSBs received in the time unit correspond to different beams;
determine, by the terminal device, whether beams corresponding to different SSBs that are received by using a same frequency in adjacent time units are the same, wherein the SSB received by the terminal device comprises a first indication, wherein the first indication indicates whether a beam corresponding to an SSB sent by the network device by using a third frequency in a first time unit is the same as a beam corresponding to an SSB sent by using the third frequency in a second time unit, the second time unit is adjacent to the first time unit, and the third frequency is any one of the at least two different frequencies; and
determine, by the terminal device based on the first indication, whether the beam corresponding to the SSB received by using the third frequency in the first time unit is the same as the beam corresponding to the SSB received by using the third frequency in the second time unit.

* * * * *